United States Patent [19]

Hetzler et al.

[11] 4,404,252

[45] Sep. 13, 1983

[54] SURFACE STABILIZED WAFERBOARD

[75] Inventors: Bernard H. Hetzler; Hugh V. Martin, both of British Columbia, Canada

[73] Assignee: MacMillan Bloedel Limited, Vancouver, Canada

[21] Appl. No.: 302,763

[22] Filed: Sep. 16, 1981

[51] Int. Cl.³ .............................................. B32B 5/16
[52] U.S. Cl. .................................... 428/326; 428/486; 428/506; 428/511; 428/530; 428/531; 428/514; 428/537; 156/62.2; 162/165; 162/172; 162/158
[58] Field of Search ............... 428/326, 506, 511, 514, 428/486, 530, 531, 498; 156/62.2; 162/165, 172, 184, 225, 158

[56] References Cited

U.S. PATENT DOCUMENTS

| | | | |
|---|---|---|---|
| 2,442,422 | 6/1948 | Loetscher | 154/133 |
| 3,301,744 | 1/1967 | Hossain | 428/498 |
| 4,053,339 | 10/1977 | Story et al. | 156/62.2 |
| 4,117,199 | 9/1978 | Gotoh et al. | 428/486 |
| 4,158,712 | 6/1979 | Degens | 428/511 X |
| 4,241,133 | 12/1980 | Lund et al. | 428/326 |
| 4,246,310 | 1/1981 | Hunt et al. | 428/326 X |

FOREIGN PATENT DOCUMENTS

| | | | |
|---|---|---|---|
| 537683 | 3/1957 | Canada. | |
| 1901039 | 8/1970 | Fed. Rep. of Germany | 428/486 |

*Primary Examiner*—P. Ives
*Attorney, Agent, or Firm*—Schuyler, Banner, Birch, McKie & Beckett

[57] ABSTRACT

A waferboard having at least one surface rendered water resistant and stabilized against wafer loss is disclosed. In the past heavy paper overlays have been used on panel surfaces. However, these paper overlays are specially treated non-porous paper and generally have to be specially applied by the addition of a glue. The waferboard of the present invention is formed of wood wafers bonded together in a hot press with adhesive resin and wax, and having a layer of porous paper bonded in the hot press to at least one surface of the waferboard. In one embodiment, the contours of the wood wafers on the surface of the waferboard are transmitted through the layer of porous paper.

35 Claims, 1 Drawing Figure

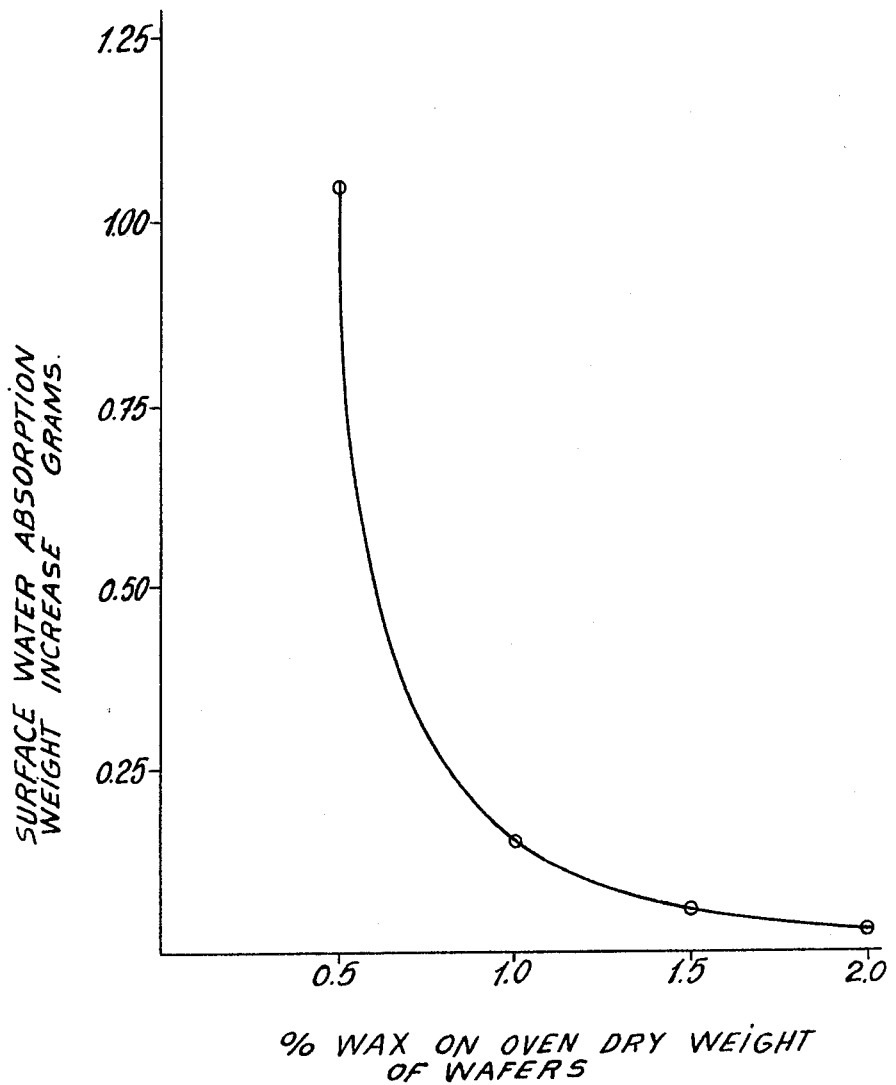

SURFACE STABILIZED WAFERBOARD

This invention relates to waferboard. More specifically the invention relates to a waferboard having at least one surface rendered water resistant and stabilized against wafer loss.

Waferboard is a panel board product made by gluing thin wood wafers together using an adhesive such a phenol formaldehyde. One problem that can occur with waferboards, particularly after short periods of exterior exposure, is the peeling and falling off of wafers from the surface of the board. When a waferboard has been painted or otherwise surface treated, loss of even a few surface wafers leaves small unpainted or untreated areas which give an undesirable blotchy appearance.

It is a purpose of the present invention to provide a waferboard which has at least one surface rendered water resistant and stabilized against wafer loss. For many applications it is sufficient to stabilize just one face of the waferboard panel, however, if necessary both faces may be stabilized.

In the past, attempts have been made to stabilize the surface of composite wood products by the addition of paper overlays. Hallonquist et al in Canadian Pat. No. 711,688 laminates a sheet of parchment or glassine paper to a board surface with an adhesive. Story et al in U.S. Pat. No. 4,053,339 also discloses laminating a paper sheet to a board surface using an adhesive mixture. Sears et al in U.S. Pat. No. 3,441,959 incorporates two sheets of paper or plastic in the central plane of a wood particle mat. The mat is then pressure cured in a press to produce two panels each having one textured and pleasing decorative face.

It has been found that utilizing a layer of "porous paper" on one or both sides of a wafer mat, a waferboard may be formed in a hot press which has at least one surface rendered water resistant and stabilized against wafer loss.

The term "porous paper" used throughout this specification means a paper that has not been coated or otherwise treated so as to substantially reduce the porosity below that of supercalendered newsprint. Specifically excluded from this definition are the parchment and glassine types of paper.

The present invention provides a waferboard having at least one surface rendered water resistant and stabilized against wafer loss formed of wood wafers bonded together in a hot press with an adhesive resin and wax, and having a layer of porous paper bonded in the hot press to at least one surface of the waferboard.

The present invention also provides in a process for manufacturing waferboard wherein wood wafers are bonded together in a hot press with an adhesive resin and wax, the improvement of imparting water resistance to and stabilizing at least one surface of the waferboard against wafer loss, comprising bonding a layer of porous paper to at least one surface of the waferboard while the wood wafers are being bonded together in the hot press.

In an embodiment of the invention, the uneven wafer contour which is characteristic of the surface of the waferboard, and which is regarded as essentially pleasing, is transmitted through the layer of paper and is still visible even after the surface has been printed. This exterior contour of the wood wafers is transmitted through lighter weight paper in the range of about 36–50 grams per sq. meter, such as newsprint, at the time of manufacture of the board. In other cases, particularly where heavier paper is used, the contour may only become evident after a period of exposure to the atmosphere, particularly under conditions of high humidity. In another embodiment of the invention, a lighter weight grade of paper is used for bonding to a waferboard and the paper sheet is rendered substantially translucent and in some cases practically transparent. Thus, the wafers are clearly visible through the paper.

In one embodiment the wax comprises an aliphatic petroleum product referred to as slack wax, and the wax content is at least about 1% of the oven dry weight of wafers and in a preferred embodiment, about 2%. It has been found that with a higher percentage of wax, the contour transmittance and translucent effect of the paper is improved, particularly in the heavier papers. The adhesive resin is preferably phenolformaldehyde and the weight of the layer of paper is not greater than about 100 grams/sq.meter, and preferably not greater than about 75 grams/sq.meter. In another embodiment the paper contains at least about 70% mechanical pulp. Both surfaces of the waferboard may have paper layers bonded thereto.

An embodiment of the invention is illustrated in the FIGURE which is a graph showing the weight increase due to surface water absorption of waferboard with one porous paper layer bonded thereto, plotted against the percent of wax applied to wood wafers.

In the preparation of waferboard, adhesive resin, in powder or liquid form, and wax, usually in the molten state, are mixed with a quantity of wood wafers. The treated wafers are spread out in a layup which is then compressed and heated in a hot press under pressure to cure the adhesive. Phenol formaldehyde is the most commonly used adhesive resin. Molten wax is applied to the wafers to impart some measure of water resistance. The curing temperature in the hot press is well above the melting temperature of the wax. The wax commonly used is predominantly an aliphatic petroleum product referred to in the petroleum industry as slack wax. This is the first waxy material separated in the refining of crude oil.

The layer of paper may conveniently be laid over the wafer layup prior to pressing so that it will contact the caul plate or press plate of the press. (In some instances a slip sheet may be placed between the caul plate or press plate and the paper layer to prevent sticking to the caul plate.) If it is desired to stabilize both faces, the paper may be laid both underneath and on top of the wafer layup so that it contacts both caul plates or press plates. Bonding a paper sheet to a board surface does not in itself necessarily provide the required stabilization. Wax plays a critical roll in the development of water resistance in paper bonded to waferboard. In the absence of wax the paper requires no resistance to the absorption of water, and thus loses its integrity when wet. As soon as this happens the capacity of the paper to stabilize the board surface is lost. Therefore, it is important that the combination of wax and adhesive resin be present not only to bond the paper to the board surface, but render the paper water resistant and improve weather resistant properties. It appears that during the heating step when the adhesive resin is cured, the wax permeates through the fibrous network of the paper sheet, thereby rendering the fibers hydrophobic and the paper sheet water repellent. The degree of water repellency achieved depends on the amount of wax applied to the wafers. For effective results the wax level should be at least 1% of the oven dry weight of wafers, preferably at least 2%. Although the laminated paper sheet is water resistant, it remains porous and capable of transmitting gases and vapors such as water vapor. This is an important feature of the present invention since it allows the escape of water vapor and other gases given off by the board on removal from the hot press, which could otherwise cause blistering in the laminated sheet.

Various grades of porous paper may be used to make the laminated product. For the best results the paper weight should not be more than 100 grams/sq. meter, and preferably not more than 75 grams/sq. meter. If heavier grades of porous paper are used the contour transmittance and translucence are reduced and higher levels of wax may be required to give the required water repellency. In addition, thicker papers particularly if they are of low density, may be lacking in internal cohesiveness when bonded to waferboard and hence be relatively easily delaminated. Because the paper layer is against the caul plate or press plate during the bonding step, the paper surface is substantially flat, although the contours of individual wafers are in some cases transmitted through the paper layer.

The preferred paper weight for the best transmittal of exterior contours of the wood wafers through the layer of paper, occurs in the range of about 36–50 grams/sq. meter. The process works well with newsprint, particularly newsprint containing at least 70% mechanical pulp. When newsprint is used as the paper layer, the surface becomes substantially water repellent and the contour of the wafers is transmitted through the paper layer immediately after manufacture. Furthermore, the paper layer becomes highly translucent, practically transparent.

Dense and relatively impermeable papers such as greaseproof, tracing, parchment, glassine and coated or waxed papers do not bond well to waferboard by the present process. With such materials, blisters tend to form between the waferboard surface and the paper layer because water vapor and other gases given off by the board in the hot press cannot escape through the impermeable layer of paper. The adhesive resin adhering to the surface wafers of the wafer layup promotes bonding between the surface of the waferboard and the paper layer. Whereas phenol formaldehyde resins are the most common used in the preparation of waferboard, the present invention is not limited in use to this particular type of adhesive resin, but may be applied in conjunction with any adhesive resin suitable for the manufacture of waferboard, either applied in liquid or powder form.

EXAMPLE 1

Samples of waferboard panels were made from 1κ" aspen wafers with an approximate moisture content of 4–5%. Powdered phenol formaldehyde resin and molten slack wax were applied simultaneously to the wafers in a dry blender. Approximatley 2% by weight of both the resin and the wax were added based on the oven dry weight of wafers. The wafers were laid up in random fashion, covered or partially covered with a sheet of the paper being investigated, the caul plate of the press brought down on the paper, and the whole pressed at 450 lbs/sq. inch for 5½ minutes at 210°–212° C.

Dry Adhesion and Cohesion:

Adhesion between the waferboard and the bonded paper sheet was checked manually. Adhesion was considered to be good if it was not possible to strip any part of the sheet from the board.

In some instances the sheet although remaining firmly stuck to the board could be delaminated, and this was taken as a reflection of the cohesiveness of the sheet. Cohesion was considered to be good if it was not possible to delaminate an area of one square centimeter or more of the sheet stuck to the board.

Wet Adhesion:

Samples were immersed in water, one inch below the surface, for twenty-four hours at 20° C. Adhesion was considered to be good if it was not possible to strip any part of the sheet from the board.

Blistering:

Samples were clamped over a heated water bath in such a way that the untreated side of the board was exposed to conditions of approximately 100% relative humidity at 54° C. and the paper bonded side exposed to the outside atmosphere. After ten days the samples were examined for blistering or raising of the paper due to humidity transfer through the board.

Surface Water Absorption:

A stainless steel tube, 3¼" long with an internal diameter of 15/16" and having squared off ends, was placed end wise on the paper layer face of a 2"×2" weighed sample board. A volume of 5 ml of water was pipetted into the tube and onto the paper layer face. After one hour the excess water was blotted from the board surface, and the sample was reweighed to give the water absorption.

Atlas Weather-Ometer:

Samples were exposed to continuous ultraviolet radiation, directed towards the paper layer surfaces, with 20 minute periods of water spray every two hours. Surfaces were examined for breakdown indicating loss of structural integrity in the paper layer.

TABLE I

|  | Sample |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Basis Weight g/m² | 49 | 36 & 40 | 49 | 75 | 49 | 105 | 200 | 125 | 90 | 70 | — | — |
| Dry Adhesion | good | good | good | good | good | good | good | poor | good | good | good | good |
| Cohesion | good | good | good | fair | good | fair | poor | poor | fair | good | good | good |
| Contour transmittance | good | good | good | poor | fair | none | none | none | poor | good | good | none |
| Wet Adhesion | good | good | — | — | — | — | — | — | — | — | good | — |
| Blistering | none | — | — | — | — | — | — | — | — | — | none | — |
| Surface Water Absorption, g | 0.034 | — | — | 0.078 | 0.095 | 0.056 | — | — | — | 0.061 | — | — |
| Weather-Ometer: |  |  |  |  |  |  |  |  |  |  |  |  |
| Unpainted, hours without breakdown | 93 | 93 | — | — | — | — | — | — | — | — | 105 | 130 |
| Painted - alkyd and letex |  |  |  |  |  |  |  |  |  |  |  |  |

TABLE I-continued

| | Sample | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| paints - hours without breakdown | 2,000 | 2,000 | 2,000 | — | — | — | 2,000 | 2,000 | — | — | 2,000 | 2,000 |

The results of testing the samples are illustrated in Table I. Samples 1, 2 and 3 all represent a newsprint paper layer. Other specimens of Sample 1 were painted with latex and alkyd paints and were exposed outside for one year with no break down. In one case a specimen of Sample 1 was exposed three months before painting without adverse effect. In Sample 3, the waferboard was made using liquid phenol formaldehyde instead of the more normal powdered adhesive resin. Samples 4 and 5 were bond paper. Sample 6 was kraft wrapping paper. Sample 7 was liner board and Sample 8 was a corrugated medium. In both samples 7 and 8 was found that the paintability was good with latex but with alkyd paint fibers became raised giving a rough surface. Sample 9 was a filter paper - Whatman No. 1. Sample 10 was a filter paper - Reeve Angel No. 202. Sample 11 was a glue line (resin impregnated) paper and paintability was good with alkyd but the latex paint could be scraped off easily. In sample 11 it was found that the paper sheet stuck to the caul plates of the press and, therefore, a slip sheet is preferably needed to preventing sticking. Sample 12 was a resin coated paper.

EXAMPLE 2

To show the importance of wax, waferboard samples bonded with a layer of newsprint weighing 49 grams/sq. meter were made by the same method as Example 1 but using wafers to which varying amounts of wax has been applied. The effect of wax level on the surface water absorption is shown in Table II and the results illustrated in the FIGURE. The data shows that at least 1% wax is preferably applied to the wafers.

TABLE II

| Wax on Wafers % of oven dry weight of wafers | Surface Water Absorption gms |
|---|---|
| 0.5 | 1.063 |
| 1.0 | 0.154 |
| 1.5 | 0.056 |
| 2.0 | 0.034 |

EXAMPLE 3

To show the effect of wax on kraft paper, kraft wrapping paper weighing 105 gms/sq.meter was bonded onto waferboard panels made by the same method as Example 1, but using wafers to which varying amounts of wax had been applied. As shown in Table III it is seen that by increasing the wax level the properties of the kraft paper bonded to the waferboard are brought closer to those of newsprint bonded to waferboard, although there is still a substantial difference, particularly in wafer contour transmittance and translucence.

TABLE III

| Wax on Wafers % | Surface Water Absorption gms | Wafer Contour Transmittance | Translucence |
|---|---|---|---|
| KRAFT WRAPPING | | | |
| 2 | 0.056 | nil | nil |

TABLE III-continued

| Wax on Wafers % | Surface Water Absorption gms | Wafer Contour Transmittance | Translucence |
|---|---|---|---|
| 4 | 0.053 | nil | nil |
| 6 | 0.044 | just detectable | low |
| 8 | 0.040 | faintly visible | substantial |
| NEWSPRINT | | | |
| 2 | 0.034 | clearly visible | practically transparent |

The embodiments of the invention in which an exclusive property or privilege is claimed, are defined as follows:

1. Waferboard having at least one surface rendered water resistant and stabilized against wafer loss, formed of wood wafers bonded together in a hot press with an adhesive resin and wax, and having a layer of porous paper bonded in the hot press to at least one surface of the waferboard, said paper retaining its porosity after said bonding in the hot press.

2. The waferboard according to claim 1 wherein contours of the wood wafers on the surface of the waferboard are transmitted through the layer of porous paper.

3. The waferboard according to claim 1 or claim 2 wherein the layer of porous paper bonded to the surface of the waferboard is translucent.

4. The waferboard according to claim 1 wherein the wax comprises an aliphatic petroleum product.

5. The waferboard according to claim 4 wherein the wax is slack wax.

6. The waferboard according to any of claims 1, 2 or 4 wherein the wax content of the waferboard comprises at least about 1% of the oven dry weight of wafers.

7. The waferboard according to any of claims 1, 2 or 4 wherein the wax content of the waferboard comprises at least about 2% of the oven dry weight of wafers.

8. The waferboard according to any of claims 1, 2 or 4 wherein the adhesive resin is phenol formaldehyde.

9. The waferboard according to claim 1 or claim 4 wherein the weight of the layer of porous paper is not greater than about 100 grams per square meter.

10. The waferboard according to claim 1 or claim 4 wherein the weight of the layer of porous paper is not greater than about 75 grams per square meter.

11. The waferboard according to claim 2 wherein the weight of the layer of porous paper is in the range of about 36–50 grams per square meter.

12. The waferboard according to claim 1 or claim 11 wherein the porous paper contains at least about 70% mechanical pulp.

13. The waferboard according to claim 1 or claim 11 wherin the porous paper is newsprint.

14. The waferboard according to claim 1 wherein both surfaces of the waferboard have a layer of porous paper bonded thereto.

15. Waferboard having at least one surface rendered water resistant and stabilized against wafer loss, formed of wood wafers bonded together in a hot press with an adhesive resin and at least about 1% of the oven dry weight of wafers of slack wax, and having a layer of newsprint bonded in the hot press to at least one surface of the waferboard, said newsprint retaining the porosity after said bonding in the hot press.

16. The waferboard according to claim 15 wherein the adhesive resin is phenol formaldehyde.

17. The waferboard according to claim 15 wherein contours of the wood wafers on the surface of the waferboard are transmitted through the layer of newsprint.

18. The waferboard according to any of claims 15, 16 or 17 wherein the slack wax content of the waferboard comprises at least about 2% of the oven dry weight of wafers.

19. The waferboard according to any of claims 15, 16 or 17 wherein both surfaces of the waferboard have a layer of newsprint bonded thereto.

20. In a process for manufacturing waferboard wherein wood wafers are bonded together in a hot press with an adhesive resin and wax, the improvement of imparting water resistance and stabilizing at least one surface of the waferboard against wafer loss, comprising bonding a layer of porous paper to at least one surface of the waferboard while to wood wafers are being bonded together with the hot press, said paper remaining porous after said bonding.

21. The process according to claim 20 wherein the wax comprises an aliphatic petroleum product.

22. The process according to claim 21 wherein the wax is slack wax.

23. The process according to any of claims 20, 21 or 22 wherein the wax bonded with the wood wafers comprises at least about 1% of the oven dry weight of wafers.

24. The process according to any of claims 20, 21 or 22 wherein the wax bonded with the wood wafers comprises at least about 2% of the oven dry weight of wafers.

25. The process according to any of claims 20, 21 or 22 wherein the adhesive resin is phenol formaldehyde.

26. The process according to claim 20 or claim 21 wherein the weight of the layer of porous paper bonded to the waferboard is not greater than about 100 grams per square meter.

27. The process according to claim 20 or claim 21 wherein the weight of the layer of porous paper bonded to the waferboard is not greater than about 75 grams per square meter.

28. The process according to claim 20 wherein the weight of the layer of porous paper bonded to the waferboard is in the range of about 36-50 grams per square meter, and exterior contours of the wood wafers on the surface of the waferboard are transmitted through the layer of porous paper.

29. The process according to claim 20 or claim 28 wherein the porous paper contains at least 70% mechanical pulp.

30. The process according to claim 20 or claim 28 wherein the porous paper is newsprint.

31. A process for manufacturing waferboard having at least one surface rendered water resistant and stabilized against wafer loss, comprising the steps of:
  preparing a layup of wood wafers with an adhesive resin and at least about 1% of the oven dry weight of wafers of slack wax,
  applying a layer of newsprint to at least one surface of the layup of wood wafers, and
  bonding the layer of newsprint and the layup of wood wafers in a hot press, said newsprint remaining porous after said bonding.

32. The process according to claim 31 wherein the adhesive resin is phenol formaldehyde.

33. The process according to claim 31 wherein contours of the wood wafers on the surface of the waferboard are transmitted through the layer of newsprint.

34. The process according to any of claims 31, 32 or 33 wherein the slack wax content added to the wood wafers comprises at least about 2% of the oven dry weight of wafers.

35. The process according to any of claims 31, 32 or 33 wherein a layer of newsprint is applied to both surfaces of the layup of wood wafers.

* * * * *